(12) United States Patent
Kok

(10) Patent No.: US 6,735,687 B1
(45) Date of Patent: May 11, 2004

(54) MULTITHREADED MICROPROCESSOR WITH ASYMMETRICAL CENTRAL PROCESSING UNITS

(75) Inventor: Jan Kok, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 540 days.

(21) Appl. No.: 09/595,076

(22) Filed: Jun. 15, 2000

(51) Int. Cl.[7] .................................................. G06F 9/38
(52) U.S. Cl. ...................................... 712/215; 712/222
(58) Field of Search ................................ 712/215, 205, 712/206, 207, 203, 28, 233, 234, 235, 237, 34, 35; 709/107, 108, 100, 200

(56) References Cited

U.S. PATENT DOCUMENTS

| | | | | |
|---|---|---|---|---|
| 5,742,780 A | * | 4/1998 | Caulk, Jr. .................... | 712/206 |
| 5,812,880 A | * | 9/1998 | Goto et al. .................... | 710/37 |
| 6,021,484 A | * | 2/2000 | Park ............................ | 712/41 |
| 6,052,720 A | * | 4/2000 | Traversat et al. ............ | 709/220 |
| 6,061,710 A | | 5/2000 | Eickemeyer et al. | |
| 6,065,037 A | | 5/2000 | Hitz et al. | |
| 6,148,395 A | * | 11/2000 | Dao et al. .................... | 712/222 |
| 6,405,302 B1 | * | 6/2002 | Ohsuga et al. ................ | 712/35 |
| 6,418,542 B1 | * | 7/2002 | Yeager ......................... | 714/38 |
| 6,434,690 B1 | * | 8/2002 | Ohsuga et al. ................ | 712/35 |
| 6,457,064 B1 | * | 9/2002 | Huff et al. ................... | 709/318 |
| 6,606,700 B1 | * | 8/2003 | Sih et al. ..................... | 712/35 |

* cited by examiner

Primary Examiner—Henry W. H. Tsai

(57) ABSTRACT

In addition to the normal circuitry which provides the normal computation, a microprocessor is provided with one or more additional but simplified central processing units which allows additional threads of execution to occur at a slower rate. The purpose of the secondary threads is to prefetch data from external storage to main memory or from main memory to cache in order to minimize waiting by the primary thread.

20 Claims, 4 Drawing Sheets

MULTITHREADED MICROPROCESSOR WITH ASYMMETRICAL CENTRAL PROCESSING UNITS

FIELD OF THE INVENTION

The present invention pertains generally to microprocessors, and more particularly to a single-chip microprocessor comprising multiple asymmetrical central processing units executing separate threads.

BACKGROUND OF THE INVENTION

Single-chip microprocessors have been around for decades and are used extensively in computer systems and other electronically controlled systems. The fundamental structure of a microprocessor includes a central processing unit (CPU), an execution unit, a memory management unit (MMU), and optionally an on-chip cache. The CPU includes a program counter which points to the location in memory from which to fetch program instructions, an instruction fetch unit (IFU) which fetches program instructions from memory and places them into an instruction cache, and an instruction decode unit which decodes the instructions in the instruction cache and facilitates the execution of the decoded instructions by an execution unit. The CPU typically includes a number of fast data/instruction registers for temporarily storing instructions or data on which operations are performed.

In the continual strive for faster and smaller electronics, much research is devoted to developing techniques for increasing the overall speed, or throughput, of the microprocessor. Throughput is measured in terms of the number of operations performed per unit of time. Conceptually, the simplest of all possible improvements to system speed is to increase the clock speeds of the various components, particularly the clock speed of the processor. For example, if everything runs twice as fast but otherwise works in exactly the same manner, the system should generally perform a given task in half the time. Increasing the clock speed indefinitely, however, is not practical due to the inherent RC delay limitations of the data signals.

Another technique for increasing the throughput is to reduce the length of the signal paths within the microprocessor. In other words, by reducing the number of components and length of wire between the components, the data signals need travel a shorter distance are subject to less RC delay. This makes it possible to increase the clock speed of the processor, and accordingly increase system speed. Despite the enormous gains in integrated circuit density, however, the ability of a chip to increase the amount of circuitry is approaching physical limits; accordingly, RC signal delay can no longer be significantly reduced by merely shortening the data signal path lengths.

Yet another technique for increasing the speed of a microprocessor is to implement switching speed enhancement hardware throughout the data signal paths. Data signal switching speed can be increased through various hardware enhancements such as the use of repeaters along signal trace lines, biasing latches in the direction of the signal transition of interest, and many other artificial enhancements. Data switching enhancement techniques are also problematic in that they increase circuit complexity, require an increased number of circuit components, and increase the total amount of space required to implement the microprocessor.

In view of the above hardware limitations, attention has therefore been directed to architectural approaches for further improvements in overall speed of the microprocessor.

One approach to increasing the average number of operations executed per clock cycle is the implementation of instruction pipelining and cache memories. Pipeline instruction execution allows subsequent instructions to begin execution before previously issued instructions have finished. Cache memories store frequently used instructions and data nearer the processor and allow instruction execution to continue, in most cases, without waiting the full access time of a primary memory. Some improvement has also been demonstrated with multiple execution units with look ahead hardware for finding instructions to execute in parallel.

Multiple functional or execution units are provided in many modern microprocessors to run multiple pipelines in parallel. In a superscalar architecture, instructions may be completed in-order and out-of-order. In-order completion means no instruction can complete before all instructions dispatched ahead of it have been completed. Out-of-order completion means that an instruction is allowed to complete before all instructions ahead of it have been completed, as long as predefined rules are satisfied.

For both in-order and out-of-order execution in superscalar systems, pipelines will stall under certain circumstances. An instruction that is dependent upon the results of a previously dispatched instruction that has not yet completed may cause the pipeline to stall. For instance, instructions dependent on a load/store instruction in which the necessary data is not in the cache, i.e., a cache miss, cannot be executed until the data becomes available in the cache. Maintaining the requisite data in the cache necessary for continued execution and to sustain a high hit ratio, i.e., the number of requests for data compared to the number of times the data was readily available in the cache, is not trivial especially for computations involving large data structures. A cache miss can cause the pipelines to stall for several cycles, and the total amount of memory latency will be severe if the data is not available most of the time. Although memory devices used for primary memory are becoming faster, the speed gap between such memory chips and high-end processors is becoming increasingly larger. Accordingly, a significant amount of execution time in current high-end processor designs is spent waiting for resolution of cache misses and these memory access delays use an increasing proportion of processor execution time.

The presence of branch instructions becomes a major impediment to improving processor performance, especially in pipelined superscalar processors, since they control which instructions are executed next. This decision cannot be made until the branch is "resolved" or completed. Branch prediction techniques have been used to guess the correct instruction to execute. As a result, these techniques are not perfect. This becomes more severe as processors are executing speculatively past multiple branches.

Another architectural approach to improving system throughput has been the use of multiple processors. This is often implemented by placing multiple identical CPUs in a single computer system, typically which services multiple users simultaneously. Each of the different CPUs can separately execute a different task on behalf of a different user, thus increasing the overall speed of the system to execute multiple tasks simultaneously. Key to this architecture is that each of the multiple CPUs in the system are identical and therefore each CPU can perform any application task.

The above use of multiple processors is problematic, however. Most application programs follow a single path or flow of steps performed by the processor. While it is sometimes possible to break up this single path into multiple parallel paths, a universal technique for doing so is still being researched. Generally, breaking a lengthy task into smaller tasks for parallel processing by multiple processors is done by a software engineer writing code on a case-by-case basis. This ad hoc approach is especially problematic for executing programs which are not necessarily repetitive or predictable.

It should thus be apparent that a need exists for an improved technique for increasing the throughput of a microprocessor.

SUMMARY OF THE INVENTION

A microprocessor architecture is presented which includes multiple asymmetrical central processing units (CPUs), including a primary CPU that executes a primary application thread and one or more secondary CPUs that execute secondary threads that monitor the progress of the primary thread and attempt to ensure that instructions are prefetched from main memory and transferred into the instruction cache, or from external storage into the main memory as needed, such that the instruction pipeline on which the execution unit operates is full as much as possible. Each secondary CPUs includes a dedicated program counter, instruction fetch unit, and instruction decode unit, just as does the primary CPU, but implements much simpler circuitry such as providing many fewer registers, if any, and a simpler instruction decode unit operating on a reduced instruction set in order to conserve chip space.

BRIEF DESCRIPTION OF THE DRAWINGS

The invention will be better understood from a reading of the following detailed description taken in conjunction with the drawing in which like reference designators are used to designate like elements, and in which.

DETAILED DESCRIPTION

Figure 1:
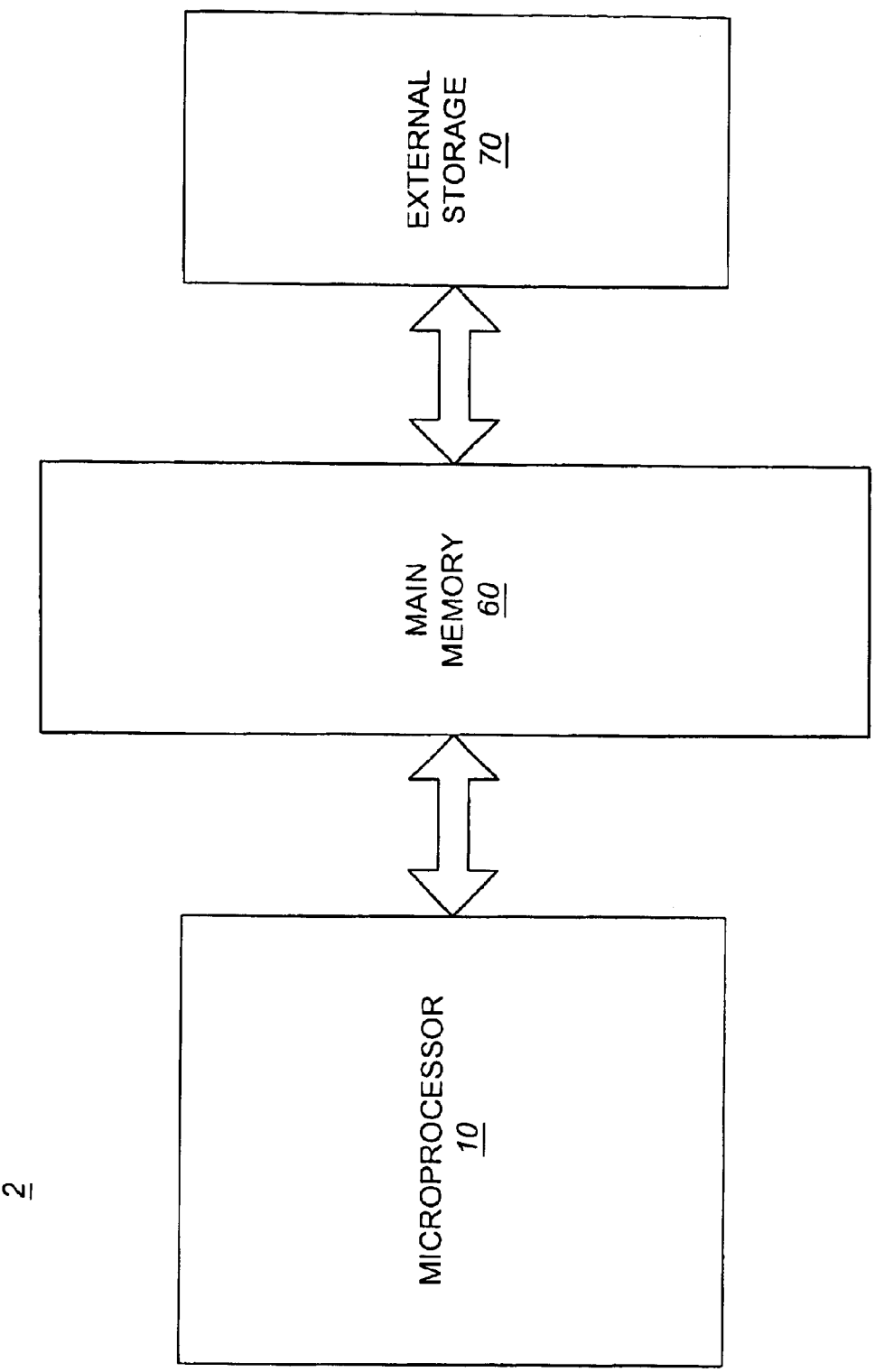
FIG. 1 is a block diagram of a system in which the invention may be implemented.

FIG. 1 is a block diagram of a computer system 2. The computer system includes a microprocessor 10 that executes application code stored in main memory 60, which may be more permanently stored in an external storage device 70.

Figure 2:
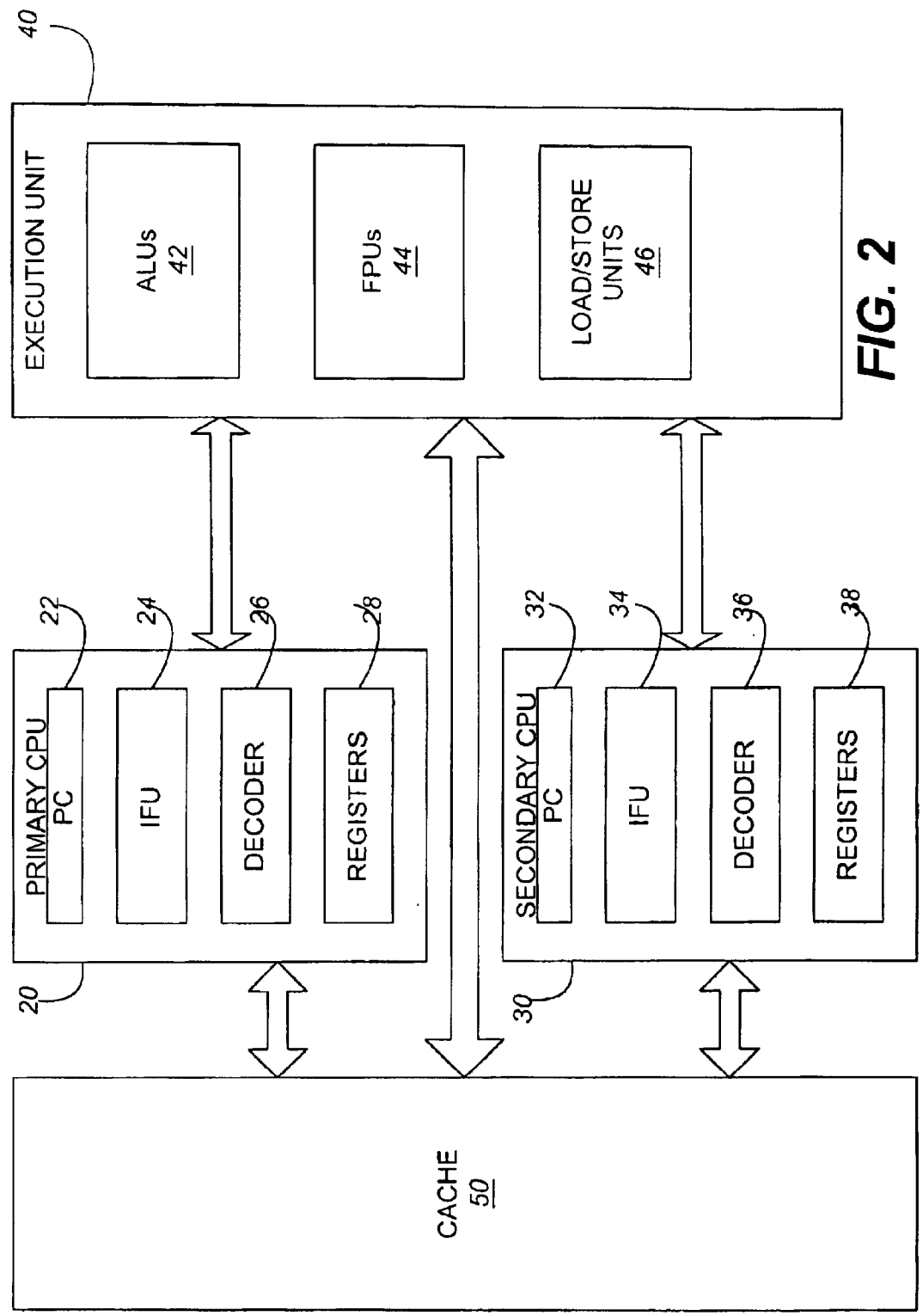
FIG. 2 is a block diagram of a multithreaded asymmetrical-CPU microprocessor implemented in accordance with the invention.

FIG. 2 is a block diagram of a microprocessor 10 implemented in accordance with the invention. As illustrated, microprocessor 10 comprises a primary computer processing unit (CPU) 20 comprising a primary CPU program counter (PC) 22, a primary CPU instruction fetch unit (IFU) 24, a primary CPU instruction decoder 26, and a set of primary CPU registers 28. Microprocessor 10 also comprises at least one simplified secondary CPU 30 (only one shown), which includes a secondary CPU PC 32, a secondary CPU IFU 34, and a secondary CPU instruction decoder 36. Secondary CPU 30 may comprise a set of registers 38, but in general, the number of registers are far fewer than the number of registers implemented in the primary CPU 20, and additionally are generally more simply implemented, and therefore slower, than the primary CPU registers in order to occupy less space.

Primary CPU 20 and secondary CPU 30 share an execution unit 40. Execution unit 40 implements all of the functionality for performing each of the instruction operations in the instruction set defined for each of the primary and secondary CPUs 20 and 30. Typically the instruction operations can be categorized into arithmetic, floating point, logic, and load/store operations. Accordingly, the execution unit 40 typically includes multiple functional units dedicated to performing these various categories of operation, such as Arithmetic Logic Units (ALUs) 42 which perform arithmetic and logic operations, floating point units (FPU) 44 which perform floating point operations, and load/store units 46 which perform memory access operations such as load and store operations.

Primary CPU 20 and secondary CPU 30 also share cache memory 50. Areas of the cache 50 may be dedicated to instruction memory and program data memory, and each of these areas may be further dedicated to the different CPUs 20 and 30. In other words, mutually exclusive portions of the cache 50 may be used only as the primary CPU instruction cache, the primary CPU data cache, the secondary CPU instruction cache, and the secondary CPU data cache. Alternatively, or in addition, portions of the cache memory 50 can be shared by both (or multiple, in the case of the implementation of additional CPUs) CPUs. Shared cache memory is particularly useful when the primary and secondary threads must communicate, as discussed hereinafter.

Figure 3:
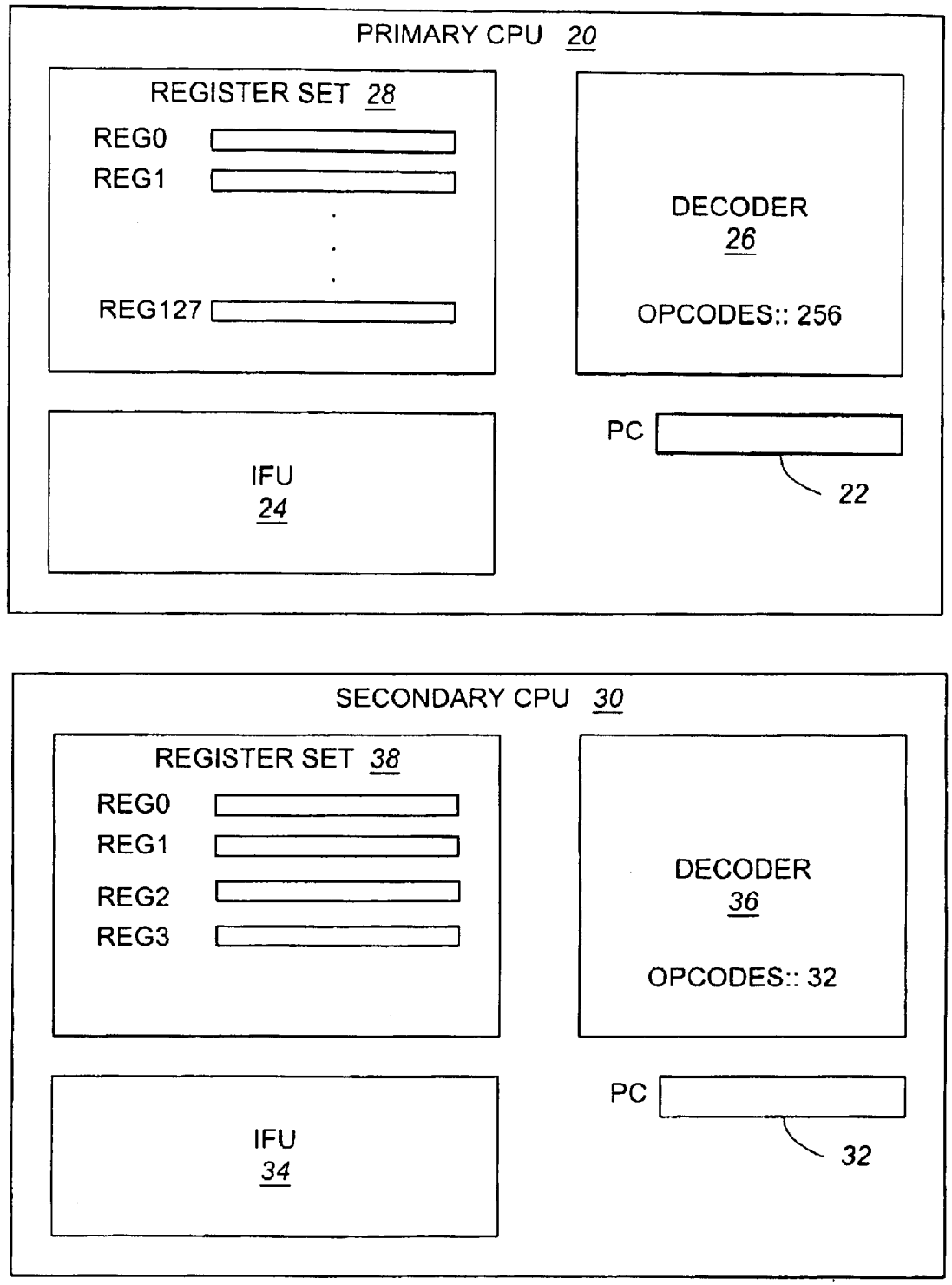
FIG. 3 is a block diagram illustrating the asymmetrical structure of the primary and secondary CPUs in accordance with the invention.

The secondary CPUs 30 are slower and perform less work than the primary CPU 20 because the secondary CPUs 30 do not execute the many detailed operations and decisions associated with the actual application that is executed by the primary thread. The purpose of the secondary code threads is simply to prefetch data from either main memory into the instruction cache, from external storage into the main memory, or from one level cache to a next level cache, or all of the above, in time for the instructions to be present in the highest level cache when they are needed. Accordingly, because the secondary CPUs perform simpler operations and make limited decisions such as keeping track of where the primary thread is in a loop, determining whether the end of the loop is approaching, and fetching more instructions from memory if so, the secondary CPUs can be implemented with slower, less complex circuitry that does not require the full features of the primary CPU. As an example, and as illustrated in FIG. 3, the register set 28 of a primary CPU 20 might include 64 or 128 registers that are optimized for speed and include a complex instruction set of 256 opcodes. In contrast, it is contemplated that the register set 38 of a secondary CPU 30 may have need only for 4 or 8 registers, which can also be implemented using more compact but slower circuitry. In addition, CPU 30 may support a reduced instruction set, for example only 32 opcodes. This allows the instruction decode unit 26 of the secondary CPU 30 to also be significantly simpler than the primary CPU instruction decode unit 36.

In accordance with the invention, each of the primary and secondary CPUs 20 and 30 receive their own dedicated set of instructions, retrieved separately from memory by their respective IFUs 24 and 34, and therefore execute separate threads of execution. In the preferred embodiment, the primary CPU executes the primary application thread. Secondary CPU 30 executes a secondary thread that prefetches instructions/data from main memory into the cache, or from external storage into main memory.

In order for independent execution of the primary and secondary CPUs 20 and 30, each CPU 20 and 30 must have a separate set of program instructions that are independently fetched and executed. Accordingly, in the preferred embodiment, a single compiler compiles a program application and generates an independent set of program instruction code for each CPU 20 and 30 in the system. In the illustrative embodiment, if the application is written in a high-level language such as C or C++, the compiler parses each function/procedure in the application code. During one pass, the compiler then generates a set of program instructions for the primary CPU 20 implementing the actual application in accordance with the high-level language program. On a subsequent pass by the compiler, the compiler then processes the primary set of instruction code generated for the primary CPU 20, and, based on the execution structure (e.g., loop and branches), generates a secondary set of program instructions for the secondary CPU 30.

In order for the secondary CPU 30 to monitor the thread of execution of the primary CPU 20, some means of communication between the threads must be provided. One technique for communicating the loop counter, for example, is to provide a special instruction executed by the primary CPU at the entrance to a loop whereby the loop count is written to special register and the act of writing the special register triggers an interrupt to the secondary CPU 30 to begin monitoring the special register. Another technique for providing this type of communication between the threads is to have the primary CPU write to a dedicated location in the cache which the secondary CPU 30 monitors. So, for example, if the secondary CPU 30 is programmed to wait until the second to last iteration of a loop being executed by the primary CPU 20, the primary CPU writes the loop count to a dedicated cache location, updating it for every iteration of the loop, and the secondary CPU 30 continually monitors the same cache location until the value indicates second to last iteration. The secondary CPU 30 then causes the next instruction code block to be prefetched.

Figure 4:
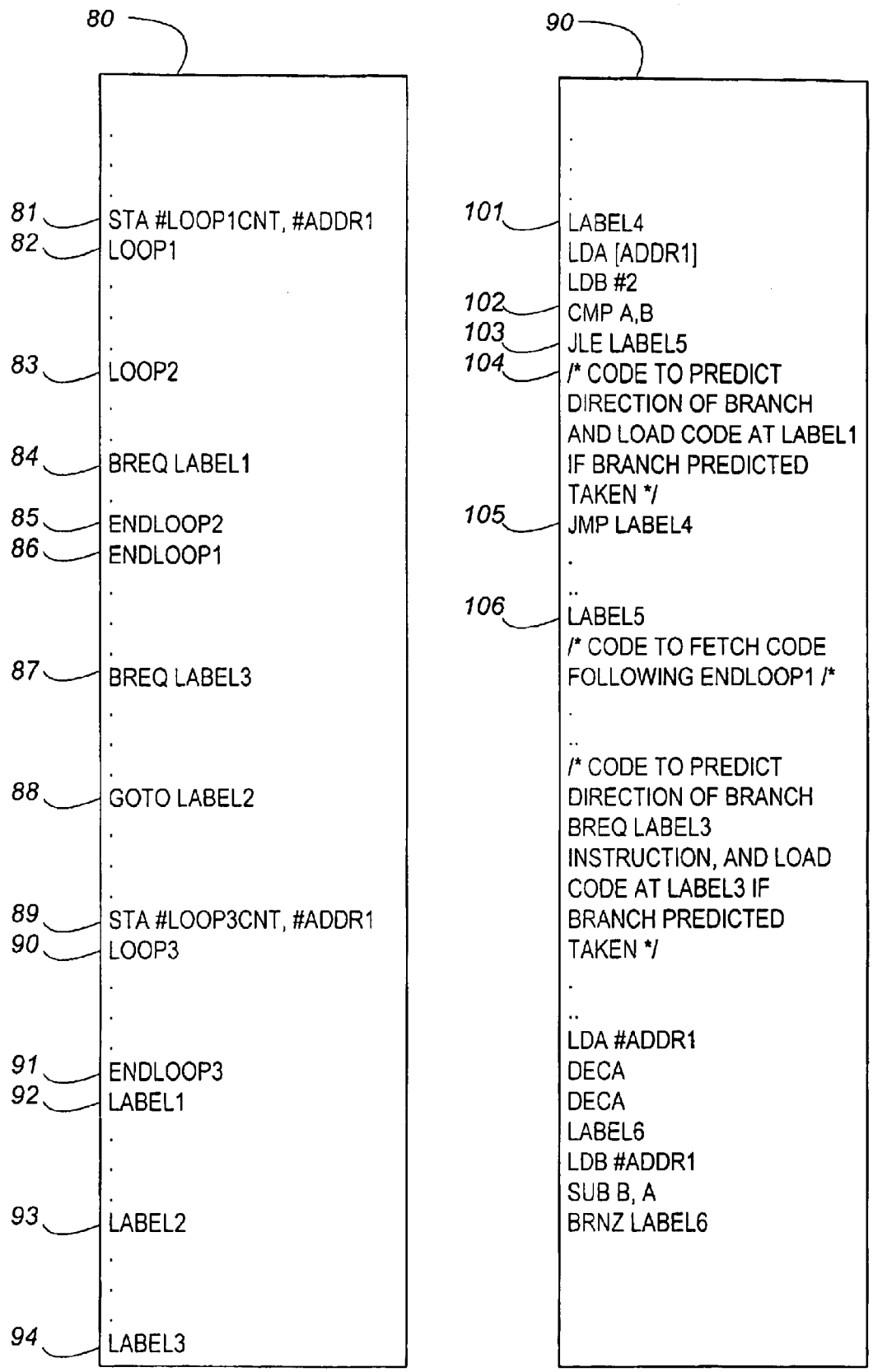
FIG. 4 is an example program instruction sequence for each of the primary and secondary CPUs.

FIG. 4 illustrates an example application program structure. Instruction sequence 80 is an example sequence of instructions generated by a compiler for the primary CPU 20. As illustrated, instruction sequence 80 includes a first loop LOOP1 beginning at 82 with the loop counter LOOP1CNT stored in cache memory at address ADDR1, per the store instruction STA at 81. First loop LOOP1 includes a second nested loop LOOP2, beginning at 83. Second loop LOOP2 includes a branch if equal instruction BREQ at 84. If the branch is taken, the code jumps to label LABEL1 at 92. Following the first and second loops (e.g., after the end loop labels ENDLOOP1 at 85 and ENDLOOP2 at 86), the instruction set 80 includes a branch if equal instruction BREQ at 87 to label LABEL3 at 94. Further along the instruction sequence 80 is a go to instruction at 88 to label LABEL2 at 93. A third loop is then entered at 90, with the loop counter LOOP3CNT stored in cache memory at address ADDR1, per the store instruction STA at 89.

The compiler for the microprocessor 10 performs a pass over the instruction sequence 80 generated for the primary CPU 20 to generate a instruction sequence 90 for secondary CPU 30. FIG. 4 illustrates an example instruction sequence 90 generated for CPU 30 based on program instruction set 80. As illustrated, the secondary instruction sequence 90 is generated to be somewhat synchronized with the execution of the primary instruction sequence 80. For example, when primary CPU 20 enters the first loop LOOP1 at 82, it will have stored a loop count LOOP1CNT at a location in cache memory that is accessible by secondary CPU 30. Secondary CPU 30 will be synchronized to begin executing the program instructions at label LABEL4 at 101 once primary CPU 20 enters LOOP1. At that point, secondary CPU loads the current loop count stored in cache memory at ADDR1 into a secondary CPU register A and compares it to a predetermined value (e.g., #2) loaded into a secondary CPU register B. If the current loop count is greater than the predetermined value in register B, secondary CPU 30 then executes instructions at 104 (not enumerated) which attempt to predict the direction of the branch instruction at 84 and load instruction code into the cache in accordance with the predicted direction of the branch. Secondary CPU 30 then jumps back to label LABEL4 at 101 and repeats the sequence of instructions. If the compare instruction at 102 determines that the current loop count stored at ADDR1 in cache memory is less than or equal to the predetermined value (e.g., #2) loaded into register B of secondary CPU 30, the CPU 30 jumps to label LABEL5 at 106 and begins executing instructions that cause the code following ENDLOOP1 at 86 for the primary CPU 20 to be fetched from main memory 60 and placed in the cache 50.

The compiler generates secondary CPU code that is semi-synchronized with the primary CPU code to fetch primary CPU code into the primary instruction cache. In this way, the secondary CPU 30 actively operates to continually ensure that instruction code is present in the cache 50 for execution by the primary CPU 20 as much as possible. Occasionally, of course, for example due to a mispredicted branch instruction, the primary CPU 20 will have to wait for the correct instruction code to be loaded into the cache. However, the overall improvement in memory management for generalized code due to the active thread of the secondary CPU monitoring the current execution location in the primary CPU code set is an overall improvement, especially in code structures that implement several or more loops.

The secondary CPU 30, or one or more additional CPUs (not shown) of similarly simplified circuitry from the primary CPU 20, may be used as described above to monitor the execution of the primary CPU 20 to ensure that primary CPU instruction code is available as much as possible in the cache memory 50. Alternatively, or in addition, secondary CPU 30, or one or more additional CPUs (not shown) of similarly simplified circuitry from the primary CPU 20, may be used to monitor execution of the primary CPU code, but looks further ahead to ensure that primary CPU instruction code that will be required in the near future is available as much as possible in the main memory 60 from extended storage 70.

The secondary CPU 30 can also be used to fetch instructions following both options of a branch instruction. In this scenario, then, the instruction code is available regardless of which direction the branch ends up going.

The use of secondary assymetrically simplified CPUs, executing a separate thread from the primary CPU, is advantageous for several reasons. The active monitoring of the primary thread of execution allows secondary execution threads to ensure as much as possible that instruction code is prefetched into the instruction cache from main memory and that potentially upcoming code is transferred into main memory from external storage in time for it to be prefetched into the instruction cache before it is needed. The use of secondary CPUs can also be used to cause code following both directions of a branch instruction to be loaded into different areas of the cache to eliminate the risk of mispredicting the direction of the branch and loading the code following the mispredicted direction.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A single-chip microprocessor comprising:
   a first computer processing unit (CPU) comprising a first instruction fetch unit which fetches a first set of instructions and executes a first thread of execution;
   a second CPU asymmetrical to said first CPU comprising a second instruction fetch unit which fetches a second set of instructions and executes a second thread of execution; and
   an execution unit shared by said first CPU and said second CPU for performing each of said first set of instructions and said second set of instructions.

2. A microprocessor in accordance with claim 1, wherein:
   said first CPU comprises a first set of registers; and
   said second CPU comprises a second set of registers, said second set of registers being fewer in number than said first set of registers.

3. A microprocessor in accordance with claim 1, wherein:
   said first CPU comprises a first set of registers; and
   said second CPU comprises a second set of registers, said second set of registers being implemented with simpler circuitry than said first set of registers.

4. A microprocessor in accordance with claim 1, wherein:
   said first CPU comprises a first set of registers; and
   said second CPU comprises no registers.

5. A microprocessor in accordance with claim 1, wherein:
   said first CPU comprises a first instruction decoder that operates on a first set of instruction opcodes; and
   said second CPU comprises a second instruction decoder that operates on a second set of instruction opcodes, said second set of instruction opcodes comprising fewer instruction opcodes than said first set of instruction opcodes.

6. A microprocessor in accordance with claim 1, wherein:
   said second thread of execution monitors said first thread of execution.

7. A microprocessor in accordance with claim 1, wherein:
   said second thread of execution operates to prefetch data from a main memory into a cache used by said first CPU.

8. A microprocessor in accordance with claim 1, wherein:
   said second thread of execution operates to prefetch data from an external storage into a main memory accessed by said microprocessor.

9. A microprocessor in accordance with claim 1, wherein:
   said second thread of execution operates to prefetch data from one level of memory to a next level of memory.

10. A single-chip microprocessor comprising:
    a first computer processing unit (CPU) comprising a first program counter, a first instruction fetch unit which fetches a first set of instructions from a first memory location indicated by said first program counter, and a first instruction decoder which decodes said first set of instructions, said first CPU executing a first thread of execution; and
    a second CPU comprising simplified circuitry than said first CPU, said second CPU comprising a second program counter, a second instruction fetch unit which fetches a second set of instructions from a second memory location indicated by said second program counter, and a second instruction decoder which decodes said second set of instructions, said second CPU executing a second thread of execution; and
    an execution unit shared by said first CPU and said second CPU for executing each of said first set of instructions and said second set of instructions.

11. A microprocessor in accordance with claim 10, wherein:
    said second thread of execution comprises a prefetch algorithm for prefetching data from primary memory into a cache used by said first thread of execution.

12. A microprocessor in accordance with claim 10, wherein:
    said second thread of execution comprises a fetch algorithm for prefetching data from external storage into primary memory used by said microprocessor.

13. A microprocessor in accordance with claim 10, wherein:
    said first CPU comprises a first set of registers; and
    said second CPU comprises a second set of registers, said second set of registers being fewer in number than said first set of registers.

14. A microprocessor in accordance with claim 10, wherein:
    said first CPU comprises a first set of registers; and
    said second CPU comprises a second set of registers, said second set of registers being implemented with simpler circuitry than said first set of registers.

15. A microprocessor in accordance with claim 10, wherein:
    said first CPU comprises a first set of registers; and
    said second CPU comprises no registers.

16. A microprocessor in accordance with claim 10, wherein:
    said first CPU comprises a first instruction decoder that operates on a first set of instruction opcodes; and
    said second CPU comprises a second instruction decoder that operates on a second set of instruction opcodes, said second set of instruction opcodes comprising fewer instruction opcodes than said first set of instruction opcodes.

17. A microprocessor in accordance with claim 10, comprising:
    an execution unit shared by said first CPU and said second CPU which executes instructions processed by both said first and second CPUs.

18. A method for increasing the throughput of a single-chip microprocessor, comprising:
    providing in said single-chip microprocessor a first computer processing unit (CPU) comprising a first instruction fetch unit which fetches a first set of instructions and executes a first thread of execution;
    providing in said single-chip microprocessor a second CPU asymmetrical to said first CPU comprising a second instruction fetch unit which fetches a second set of instructions and executes a second thread of execution; and providing a single execution shared by said first CPU and said second CPU for performing each of said first set of instructions and said second set of instructions.

19. A method in accordance with claim 18, wherein:
said second thread of execution comprises a prefetch algorithm for prefetching data from primary memory into a cache used by said first thread of execution.

20. A microprocessor in accordance with claim 18, wherein:
said second thread of execution comprises a fetch algorithm for prefetching data from external storage into primary memory used by said microprocessor.

* * * * *